UNITED STATES PATENT OFFICE.

CARL HOEPFNER, OF GIESSEN, GERMANY.

PROCESS OF PRODUCING CUPROUS OXIDS.

SPECIFICATION forming part of Letters Patent No. 552,960, dated January 14, 1896.

Application filed October 7, 1893. Serial No. 487,413. (No specimens.)

*To all whom it may concern:*

Be it known that I, CARL HOEPFNER, a subject of the German Emperor, residing at 36 Frankfurterstrasse, Giessen, Germany, have invented certain new and useful Improvements in and Relating to the Production of Cuprous Oxid from Ores or other Materials; and I do hereby declare the following to be a clear and exact description of the invention.

My invention has relation to the production of copper in the form of cuprous oxid or in the form of cuprous carbonate from ores or other materials containing sulfur compounds or combinations of copper; and it consists in a novel process, as will now be fully described.

In carrying out my invention the ore or furnace product containing sulfur combinations of copper is first comminuted or ground, after which the copper is leached out by means of a solution of chlorid of copper containing a solvent of cuprous chlorid—as, for instance, by means of a solution of copper in sodium chlorid or by means of a solution of chlorid of copper in a lye of or containing calcium chlorid—whereby the sulfur combination of copper and the cupric chlorid in the solution act upon each other, so as to produce cuprous chlorid in the solution, the reaction taking place according to the following chemical formula:

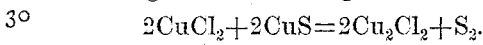

The solution is now separated from the solid material and treated as follows: The silver, bismuth, iron, arsenic, antimony, lead, and such other metals other than copper as may be present are eliminated from the solution by means of a suitable precipitant—as, for instance, by means of copper, cuprous oxid, cuprous carbonate, oxychlorid of copper, ($Cu_3Cl_2O$,) oxygen, alkalies, and alkaline earths—in a caustic state or in the form of carbonates and sulfids. When oxychlorid of copper or oxygen, or when an alkali or an alkaline earth or their carbonates and sulfids are employed as precipitants, the proportions should be so chosen as to precipitate the metals other than copper above referred to, and which precipitate prior to the copper, and these proportions must of course be regulated in accordance with the percentage of the metals other than copper in the solution, and is done by analysis.

The solution having been freed from metals other than copper may then be treated, for instance, with an alkali or an alkaline earth, either in the form of a carbonate or in a caustic state, as caustic lime, in such proportions as to precipitate all of the copper present, or, for purposes hereinafter explained, only a portion thereof, the copper being obtained in the form of substantially pure cuprous oxid ($Cu_2O$) or in the form of cuprous carbonate, ($Cu_2CO_3$,) according to the nature of the precipitant employed, the reaction taking place in accordance with the following formula:

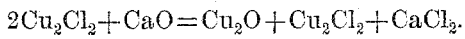

Should the precipitate still contain lead or arsenic or antimony, these can be removed by treating the precipitate with a solution of an alkali, so that a nearly chemically-pure cuprous oxid, or cuprous carbonate, as the case may be, is obtained as a final product, which is available for any desired purpose. In order, however, that the process of extraction may be made a continuous one, I precipitate only a part of the copper present in the solution, as above stated, and to this end I preferably divide the cupriferous solution into two parts, either before or after elimination of any metals other than copper that may be present in the solution. From one portion of the solution I precipitate the copper in the form of cuprous oxid or cuprous carbonate, as above described, if the solution is free from other metals; if not, I first remove all metals other than copper, as hereinbefore set forth.

The second portion of the solution, freed from metals other than copper or not, is employed as a leaching agent for fresh batches of crude material, for which purpose I first convert the chlorine combination of copper in the solution into a cupric chlorid, by means of a suitable acid, preferably under the action of atmospheric air or oxygen, or in the presence of chlorine, and as a converting agent sulfurous acid in presence of atmospheric air or oxygen will be found not only of particular advantage, but very cheap, the reagent being subsequently recovered by precipitating the same from the cupriferous solution by means of calcium chlorid under intermediate formation of hydrochloric acid, these reactions taking place in accordance with the following chemical equation:

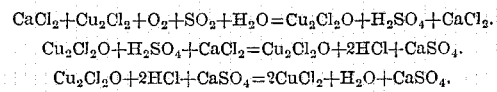

This second portion of the solution containing cupric chlorid, is, as stated, employed as a leaching agent for fresh batches of crude material containing sulfur combinations of copper, whereby a solution containing cuprous chlorid is obtained by the action of the cupric chlorid upon said sulfur combinations of copper, the cuprous chlorid remaining in solution, since the latter contains a solvent of cuprous chlorid.

It will be seen that by dividing the solution obtained from the crude material the process of obtaining substantially pure cuprous oxid can be made a continuous one, cuprous oxid being obtained from a portion of said solution, while the other portion is employed as a leaching or extracting agent in which the proportion of copper can be maintained practically constant by admixture therewith in suitable proportions of that portion of the solution from which the copper has been removed in the form of cuprous oxid.

In order to prevent the accumulation of nickel in the leaching or extracting solution, and also the contamination of the copper by the nickel, or for the purpose of obtaining nickel also, in case the material treated is sufficiently rich in that metal, I treat the cupriferous material with the described leaching agent in such proportions as to dissolve the sulfur compound of nickel only, and I then extract the nickel from its solution by electrolysis. To this end the leaching agent should contain two molecules of chlorid of copper ($CuCl_2$) to every molecule of sulfur compound of nickel (NiS) present in the material treated, and for the calculation of these proportions the following equations, which show the reactions that take place, will serve as a guide:

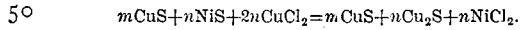

Should the proportion of leaching agent employed be in excess of what is actually required to dissolve out the sulfur compound of nickel, whereby more or less of the sulfur compound of copper would also be dissolved, I remove the latter metal by means of a suitable precipitant before extracting the nickel electrolytically.

Having thus described my invention, what I claim as new, and desire to secure by Letters Patent, is—

1. The process, which consists in leaching cupriferous materials with a cupric chlorid solution containing a solvent of cuprous chlorid whereby a solution containing cuprous chlorid is obtained, reconverting the cuprous chlorid in a portion of the solution into cupric chlorid, and converting the cuprous chlorid in the other portion of the solution into cuprous oxid by means of a suitable reagent, for the purpose set forth.

2. The process which consists in leaching cupriferous materials with a cupric chlorid solution containing calcium chlorid, whereby a solution containing cuprous chlorid is obtained, converting the cuprous chlorid in a portion of the solution into cupric chlorid by means of a suitable acid, as sulfurous acid in the presence of oxygen, freeing the other portion of the solution from metals other than copper, and converting the cuprous chlorid therein into cuprous oxid by means of a suitable reagent, as caustic lime, substantially as set forth.

3. In the extraction of copper in the form of cuprous oxid from cupriferous and nickeliferous materials, the process of preventing an accumulation of nickel in the leaching solution, which consists in first extracting the nickel by leaching the material with a solution of cupric chlorid and eliminating the nickel from the solution by electrolysis, substantially as set forth.

In witness whereof I have hereto signed my name in the presence of two witnesses.

CARL HOEPFNER.

Witnesses:
HENRY ORTH,
HENRY ORTH, Jr.